US Patent [19]

Frazier et al.

[11] 4,435,372
[45] Mar. 6, 1984

[54] PRODUCTION OF PURIFIED STRONG WET-PROCESS PHOSPHORIC ACID

[75] Inventors: Alva W. Frazier; Ewell F. Dillard, both of Florence, Ala.

[73] Assignee: Tennessee Valley Authority, Muscle Shoals, Ala.

[21] Appl. No.: 458,403

[22] Filed: Jan. 17, 1983

Related U.S. Application Data

[63] Continuation of Ser. No. 417,804, Sep. 13, 1982, now Defensive Publication No. T103,202.

[51] Int. Cl.³ ............................................. C01B 25/16
[52] U.S. Cl. ............................... 423/321 R; 423/319; 423/320; 423/472
[58] Field of Search ............... 423/316, 317, 319, 320, 423/321 R, 472

[56] References Cited

U.S. PATENT DOCUMENTS

| | | | |
|---|---|---|---|
| 3,338,675 | 8/1967 | Gilbert | 423/321 R |
| 3,379,501 | 4/1968 | Treitler et al. | 423/321 R |
| 3,819,810 | 6/1974 | Goldstein | 423/321 R |
| 4,299,804 | 11/1981 | Partis et al. | 423/321 R |

OTHER PUBLICATIONS

Lehr et al., "Precipitated Impurities in Wet-Process Phosphoric Acid," Agricultural and Food Chemistry, vol. 14, 1966, pp. 27–32.
Farr et al., "System $CaO-P_2O_5-HF-H_2O$: Equilibrium at 25° and 50°", Journal of Physical Chemistry, 66,318 (1962).
Progress Report of the Research Branch, Division of Chemical Development, TVA, Jan. 1982.
Frazier et al., "Chemical Behavior of Fluorine in Production of Wet-Process Phosphoric Acid," Environmental Science & Technology, 1977, pp. 1007–1014.

Primary Examiner—Gregory A. Heller
Attorney, Agent, or Firm—Robert A. Petrusek

[57] ABSTRACT

The concentration of impurities in wet-process phosphoric acid limits the usefulness of the acid for the production of fertilizers, feedgrade phosphate and detergents. The aluminum, magnesium, and fluoride impurities are removed with the calcium sulfate hemihydrate filter cake by hydrolyzing and recycling the off-gas scrubber solutions in the presence of a ferric iron catalyst. The aluminum and magnesium are reduced to less than 0.1 percent in the acid product by the precipitation of $(Ca,Mg)Al_2F_8\cdot 2H_2O$, which is acid insoluble and suitable for storage with the byproduct calcium sulfate. Ferric iron also serves as a catalyst for the simultaneous precipitation of $(Na,K)_2SiF_6$. Subsequent additions of potassium as, for example, in the teachings of Gilbert (U.S. Pat. No. 3,338,675), can then be applied to obtain a purified phosphoric acid product suitable for most commercial applications.

26 Claims, No Drawings

PRODUCTION OF PURIFIED STRONG WET-PROCESS PHOSPHORIC ACID

The invention herein described may be manufactured and used by or for the Government for governmental purposes without the payment to us of any royalty therefor.

This application is a continuation of application Ser. No. 417,804, filed Sept. 13, 1982, for Production of Purified Strong Wet-Process Phosphoric Acid, now Defensive Publication No. T103,202, publication July 5, 1983.

INTRODUCTION

This invention relates to the production and more particularly to the purification of phosphoric acids prepared commercially from impure phosphate rock by wet-process methods. All such acid products are produced from phosphate rock as the source of the plant nutrient, $P_2O_5$. The phosphate rock is mined in various locations throughout the United States and the world and each rock contains different amounts of several impurities. The phosphate rock is converted to wet-process phosphoric acid by reacting it with sulfuric acid.

The process involves the formation of a slurry comprising the phosphoric acid, calcium sulfate, monocalcium phosphate, and sulfuric acid. There are three main approaches for the production of phosphoric acid by the so-called wet process and they have been assigned names based on the description of the byproduct, calcium sulfate, produced thereby; to wit, the gypsum or dihydrate process, the hemihydrate process, and the anhydrite process. Temperature and the concentration of the $P_2O_5$ in the liquid phase of said slurry are the main variables upon which the form of the byproduct is dependent. In the dihydrate process, the byproduct form is gypsum when the temperature of the slurry is held below about 90° C. and the $P_2O_5$ concentration of the phosphoric acid is about filter grade, i.e., about 30 percent. If the temperature of the slurry is allowed to increase upwards to about 110° C. or 120° C. and if the $P_2O_5$ concentration of the phosphoric acid is about 40 to 55 percent, then the second main byproduct process will be effected, to wit, the hemihydrate method. Likewise, if the temperature of the slurry is allowed to increase still further, i.e. upwards of about 130° C., and the $P_2O_5$ concentration of the phosphoric acid is greater than that of hemihydrate grade acid, i.e., in excess of 40 to 55 percent, then the byproduct, calcium sulfate, will be of the anhydrite type. Each of these processes, of course, has its advantages and disadvantages. The latter process proves to be the most difficult to run on a commercial scale due to the high temperatures involved, the corrosive effects of the acid, and the instability of the anhydrite aggregates during the processing. The hemihydrate process is the second most difficult to run; however, it would probably be the best compromise of the three in that it is easier to run than the anhydrite process and yields a more concentrated acid than the dihydrate process. For a more complete dissertation on the numerous problems inherent in the production of phosphoric acids by these wet-process methods including the deleterious effects of such variables as the $P_2O_5$ concentration of the liquid portion of the reaction slurry, the sulfate concentration of the slurry as well as the relative amounts of solids in the slurry, see U.S. Pat. No. 4,132,760. The entire disclosure specifically, but not exclusively, the background portion thereof and including references incorporated therein, is incorporated herein by reference thereto.

The resulting liquid acid is separated from the byproduct, calcium sulfate and precipitated impurities, by filtration. Small quantities of dissolved impurities cause these acid products to be undesirable for the production of fluid fertilizers, feed-grade phosphate materials, and detergents. The present invention demonstrates that controlling the quantitative ratios of the impurity components in the presence of a catalytic agent, ferric iron, said ferric iron being solubilized or sequestered therein by the presence of predetermined quantities of fluorine, will cause complete precipitation of undesirable impurity compounds in these acids. What is meant herein by the term "complete precipitation" is that the finished acid product, i.e., after it is subjected to the treatment according to the instant invention including the post-removal of said ferric iron—for instance, Gilbert infra—will be comparable to a phosphoric acid approximately between that of the original starting wet acid and that produced by the furnace method in relation to impurity content. As such, it is highly desirable as a starting material for both the production of fertilizers, including high-analysis solutions, and the production of sodium phosphate based detergents, and probably as a starting material for animal feed grade supplements. Subsequently, the teachings of U.S. Pat. No. 3,338,675, Gilbert (the entire disclosure of which is incorporated herein by this reference thereto) can be applied to remove this ferric iron to produce a highly purified acid product.

BACKGROUND

1. Field of the Invention

Wet-process phosphoric acid as produced supra by the fertilizer industry is a complicated chemical mixture involving the eleven major chemical elements of $P_2O_5$, CaO, $SO_3$, $Fe_2O_3$, $Al_2O_3$, $K_2O$, $Na_2O$, MgO, $SiO_2$, F, and $H_2O$. Thus, according to the phase system rule, at any given temperature and pressure, ten stable solid phases can exist together in equilibrium. In most commercial products, these possible solids do not present a problem at filter grade, 30 percent $P_2O_5$ acid concentrations obtained by the calcium sulfate dihydrate process. A previous report (Frazier, Lehr, and Dillard, TVA Bulletin Y113, NFDC, Muscle Shoals, Alabama) shows that 30 percent $P_2O_5$ acid is a sufficient solvent for the associated impurities, so that only $CaSO_4.2H_2O$ is a byproduct. The results show that $(Na,K)_2SiF_6$ is precipitated with the gypsum but is redissolved during the wash cycle and returned to the acid product. Also, the report shows that the other possible, stable precipitates at 30 percent $P_2O_5$, will require significant compositional increases in impurity levels to effect their crystallization as solid phases. The primary reason for this lack of impurity precipitation is the high quantity of free water available for ionization of the acid hydrogen which acts as an effective solvent. In strong acids (40–55 percent $P_2O_5$) produced by the calcium sulfate hemihydrate process or by concentration of the 30 percent acid, two major factors contribute to the precipitation of impurities. First, as concentrations near 45 percent $P_2O_5$ are attained, solvent water and ionized hydrogen are reduced to a very low level. Secondly, the dissolved impurities are concentrated, along with the $P_2O_5$, above the saturation levels required for the precipitation of several solid phases. In fact, data will be presented to demonstrate that every component in commercial 45-55 percent $P_2O_5$ acid can be precipitated to a solid fraction. A lack of control of the impurity ratios in a 45 percent $P_2O_5$ acid process can result in sufficient $P_2O_5$ retention in the filter cake that further processing of the cake will be necessary to recover these $P_2O_5$ values. Thus, an understanding of the unique chemical properties of these solutions is necessary in order to obtain high-analysis acid products without excessive $P_2O_5$ losses. Data from our chemical study will show the compositional variations necessary to cause undesirable components to be precipitated and, at the same time, minimize the precipitation of $P_2O_5$.

2. Description of the Prior Art

In the fertilizer industry, purified acids are necessary for the production of stable fluid fertilizers in order to avoid chemical and physical problems due to post precipitation of the dissolved impurities. Feed grade phosphate materials and phosphate detergents have even higher impurity restrictions than fertilizers. The prior art discloses many single-step processes for reducing specific impurities in wet-process acid products without considering interaction and catalytic effects of other impurities. Many of these, such as U.S. Pat. Nos. 3,935,298 and 3,562,769, recommend a pretreatment of the phosphate rock to prevent the incorporation of other impurities which reduce the effectiveness of their teachings. Others, such as U.S. Pat. Nos. 3,408,162, 3,554,694, 3,642,439, and 2,954,287, teach the use of agents which again singly reduce one impurity without restricting the levels of other impurities. The interaction effects of other materials are not considered; for example, U.S. Pat. No. 4,299,804 does not recognize the need for aluminum in reducing the magnesium content by adding fluoride even though the precipitating compound is a magnesium fluororaluminate. Thus, these teachings are restricted to acid products of high aluminum content. The present invention discloses the types and quantities of impurity precipitates that can be crystallized from strong (40-55 percent $P_2O_5$) phosphoric acid solutions and the importance of the catalytic effect of ferric iron on maximizing the quantity of each. Likewise, the necessary amendments required for maximizing the quantity of each precipitate are presented.

SUMMARY OF THE INVENTION

A controlled and systematic study was conducted to determine the total chemical properties of both the solid and liquid fractions in simulated wet-process phosphoric acids having impurity levels comparable to those found in typical commercial products. These impurity levels included those expected from all domestic phosphate rock sources used today. Analysis of the data disclosed an unpredictable effect that contributed significantly to the precipitation of all the dissolved impurities. This discovery is the catalytic effect that dissolved ferric iron has on the natural precipitation of $(Na,K)_2SiF_6$, $(Fe,Al)_3KH_{14}(PO_4)_8.4H_2O$, and $(Ca,Mg)Al_2F_8.2H_2O$. The results show that these three crystalline compounds constitute the major fraction of the precipitating impurities from strong wet-process phosphoric acid. At high aluminum values (3.0 percent $Al_2O_3$) and low fluorine levels (2.0 percent) another series of compounds was shown to occur. These are the group of aluminum phosphate fluorides which the embodiments of the present invention also will eliminate as possible precipitating phases, since these contribute to undesirable phosphate retention in byproduct filter cake. Two of these compounds were identified as $AlHPO_4F.2H_2O$ and $Al(H_2PO_4)_2F$ by chemical and microscopic analytical techniques. A third compound was recognized but not fully identified. The precipitation of these three aluminum phosphate fluorides are prevented by the fluoride control described in the embodiment of this invention. Thus, another discovery of this study is the use of fluoride amendment to reduce phosphate retention due to precipitated phosphate salts in hemihydrate filter cake byproducts.

These laboratory scale results have been partially confirmed by unpublished data from a TVA pilot plant operation in which retention times ranged from about 1.0 to about 1.5 hours.

EXPERIMENTAL PROCEDURES AND FACTORAL STUDIES

The fundamental chemical tests designed to determine how the chemical parameters control impurity precipitation in strong wet-process phosphoric acid was a comprehensive six-variable, two-level factorally designed study. For this experiment, the mid-range temperature was chosen as 90° C.; the $P_2O_5$ was set at 45 percent (to be comparable with hemihydrate acid processes); the fluoride concentration was initially 4 percent (corresponding to the initial total fluoride contributed by the input phosphate rock feed); excess $SO_3$ was set at 0.5 percent; and calcium was charged as $CaSO_4.\frac{1}{2}H_2O$ to maintain its saturation. These conditions correspond to those encountered during the production of wet-process acid by the hemihydrate process.

The six cation parameters (with corresponding low and high concentration levels) are: $Fe_2O_3$ (1.5-3.0%), $Al_2O_3$ (1.5-3.0%), MgO (0.4 and 1.0%), $SiO_2$ (0.5-1.0%), $Na_2O$ (0.5-1.0%), and $K_2O$ (0.1-0.4%). The low level of these constituents are comparable to those found in acids prepared from Central Florida phosphate rock. The high level used for each impurity represented a range of values found for Western and North Carolina rock sources, as well as for marginal rock sources (for example, Florida pebble) that are being used as feed for standard wet-process acid processes. The study was also designed so that properties of acids at even higher impurity levels could be predicted. Sixty-four equilibration samples were initially prepared to represent all possible combinations of the variables cited above. After equilibration with frequent agitation for two weeks, the solid and liquid phases were isolated for chemical analysis and microscopic characterization of the solid components. The ferric iron source for this study was the natural mineral, $Fe_2O_3.H_2O$, goethite; however, in actual practice, any soluble ferric iron source such as $Fe_2(SO_4)_3$ is effective as an iron amendment to obtain the catalytic effect demonstrated by this study. In fact, ferrous sources such as metallic iron (scrap) can be utilized if an oxidant such as nitric acid is used to convert it to the ferric state.

We found from this study that three precipitating compounds, namely, $(Fe,Al)_3KH_{14}(PO_4)_8.4H_2O$, $(Mg,Ca)Al_2F_8.2H_2O$, and $(Na,K)_2SiF_6$, accounted for 92 percent or more of the impurity components in 77 percent of the equilibrium cells. The remainder of the cells contained 81 to 92 percent of these same solids, with the most significant diluent being one of the aluminum phosphate fluorides, supra. Subsequent studies at a lower fluoride level (2 percent F) showed that precipitation of the aluminum phosphate fluorides become more significant and result in phosphate retention in the filter cake. A model analysis was determined for each of the 64 solid factions from the initial study and for each of the 16 additional samples at the lower fluoride level. By this technique, the solid phase compositions as determined by optical microscopy and chemical analysis are quantified to give the weight percent of each compound in each equilibrium cell. An analysis of variance was then made to determine the effect of the six cation variables on the weight percent of each precipitating compound. The extremely complex nature of this wet-process acid system produced unexpected results, as shown in table I below, wherein the relative effect of each variable on the precipitation of each compound is given.

TABLE I

Analysis of Variance
F *Value Above 95 Percent Significance[a]

| Source of Variation[b] | Precipitation Compound | | |
|---|---|---|---|
|  | $(Fe,Al)_3KH_{14}(PO_4)_8 \cdot 4H_2O$ | $Na_2SiF_6$ | $(Ca,Mg)Al_2F_8 \cdot 2H_2O$ |
| Fe | 95(+) | 9.11(+) | 16(+) |
| Al | 8.6(+) | — | 22(−) |
| Mg | — | — | 17(−) |
| Si | — | 18(+) | 42(−) |
| Na | 4.9(+) | 63(+) | — |
| K  | 74(+) | — | — |

[a]F *values ≧ 4.00 are significant (95%); values ≧ 7.1 are highly significant (99%); values ≧ 14 are very highly significant (99.9%). (+) and (−) indicate an increase or decrease in % precipitate with increase in variant.
[b]Other acid components were 45% $P_2O_5$, 4.0% F, 0.5% $SO_3$, and saturation with respect to $CaSO_4 \cdot 0.5H_2O$.

Referring now more specifically to table I, note that a value near or above 7.1 is 99 percent effective in the precipitation of the compound when a positive sign is given. A negative sign indicates significance toward solubilizing the compound or preventing its precipitation. As is well known in the art, the "common ion" effect is readily explained as a positive effect; for example, higher sodium values in the solution faction causes a higher sodium value in the solid faction. A negative effect for a "common ion" is unexpected, surprising, and difficult to explain except by assumption of an unidentified complex ion formation in solution. For example, the 22(−) value for the effect of Al on precipitation of $(Ca,Mg)Al_2F_8 \cdot 2H_2O$ shows that merely increasing the aluminum component in solution decreases the quantity of $(Ca,Mg)Al_2F_8 \cdot 2H_2O$ that will precipitate. With all other parameters equal, this can only be explained by the postulation that higher Al/F ratios cause solution complexes which do not meet the $Al^{3+}$ ionic concentration requirements for $(Ca,Mg)Al_2F_8 \cdot 2H_2O$ precipitation. The stoichiometric weight ratio of $Al_2O_3/MgO$ in $MgAl_2F_8 \cdot 2H_2O$ is 2.53; however, the data shows that 1.5 percent $Al_2O_3$ (low level tested) in these strong acids is sufficient to reduce up to 1.0 percent MgO to an acceptable level by the precipitation of $MgAl_2F_8 \cdot 2H_2O$. For acids of higher magnesium values, an aluminum enrichment will be necessary to maintain stoichiometric requirements.

A second factoral study was conducted at 2 percent fluorine (instead of 4 percent F) to determine the effect of fluorine on the precipitation of the three primary impurity solids that form in these strong acids. The results are illustrated in table II below.

TABLE II

Analysis of Variance
F *Value Above 95 Percent[a]

| Source of Variation[b] | Precipitating Compound in 32 Cell Factorial | | |
|---|---|---|---|
|  | $(Fe,Al)_3KH_{14}(PO_4)_8 \cdot 4H_2O$ | $NaSiF_6$ | $(Ca,Mg)Al_2F_8 \cdot 2H_2O$ |
| Fe | 76(+) | 3.4(+) | 7.4(+) |
| Al | — | — | 25(−) |
| K  | 121(+) | — | — |
| F  | 56(−) | — | 24(+) |

[a]F *Values ≧ 4.2 are significant (95%); values ≧ 7.7 are highly significant (99%); values ≧ 14 are very highly significant (99.9%). (+) and (−) indicate an increase or decrease in % precipitate with increase in variant.
[b]Other acid components were prepared at 45% $P_2O_5$, 0.5% $SO_3$, 0.5% $SiO_2$, 0.5% $Na_2O$, and 0.1% $K_2O$.

Referring now more specifically to table II above, the results therein show several benefits of higher fluoride levels at controlled aluminum concentrations. Because of the numerous and highly significant interaction effects, it is difficult to describe the result of increasing any one element in this acid system. However, when only the single variable effects are analyzed, a comparison of the data from the two factoral studies show that increasing fluorine decreases the effect of iron on the precipitation of $(Fe,Al)_3KH_{14}(PO_4)_8 \cdot 4H_2O$ (this value is 95(+) in table I above and 76(+) in table II above). Likewise, another gain is made in the effect of ferric iron on the precipitation of $(Ca,Mg)Al_2F_8 \cdot 2H_2O$ (compare 16(+) in table II with 7.4(+) in table I). Two more direct benefits are shown in that increasing fluorine will sequester $(Fe,Al_3KH_{14}(PO_4)_8 \cdot 4H_2O$ and the aluminum phosphate fluorides and increase the precipitation of $(Na,K)_2SiF_6$ and especially $(Ca,Mg)Al_2F_8 \cdot 2H_2O$. Thus, maintaining the input fluorine level in the acid product provides several desirable chemical properties. Another valuable feature of $(Mg,Ca)Al_2F_8 \cdot 2H_2O$ is its acid and water insoluble property which provides an inert fluorine form for pond water storage with the calcium sulfate byproduct without subsequent dissolution and redistribution to the environment.

These studies were conducted at nominal impurity levels, typical of acids prepared from Florida phosphate rock. This approach was taken so that a natural selection of precipitating solids could be controlled by small changes in concentration of specific components of the acid product. Under these conditions, an increased concentration of any impurity could be compensated by small increases of other constituents. For this chemical system, fluorine, silica, sodium, and potassium are not required agents capable of individually preventing the formation of $Fe_3KH_{14}(PO_4)_8.4H_2O$ or of increasing the quantity of $Na_2SiF_6$. However, the data show that the precipitation of all the stable compounds is catalyzed by ferric iron in solution at or near 3.0 percent $Fe_2O_3$. Precipitation will continue until both $K_2O$ and $Na_2O$ are reduced to values below 0.05 percent. The excess silica in the system is naturally eliminated as the gaseous compound $SiF_4$, which is scrubbed from the off-gas, hydrolyzed in the scrubber and recycled as HF to the acid dissolution process. This recycling of the fluorine solves two major problems for the wet-process acid industry: (1) fluorine evolution to the environment is eliminated, and (2) an external source of fluorine is not required for precipitation of the aluminum and magnesium impurities. As shown by the results in tables I and II, supra, and the examples given below, there are two primary preferred embodiments to the ultimate practice of these teachings. The primary factor is the requirement for around 3 percent solubilized $Fe_2O_3$ as ferric iron which is instrumental in causing the natural precipitation of sodium, potassium, aluminum, magnesium, and silicon. The other embodiment concerns the ratio of aluminum to magnesium which for typical acids from Western U.S.A., North Carolina, and Florida phosphate sources is always satisfactory for the formation of $MgAl_2F_8.2H_2O$. The required weight ratio of $Al_2O_3/MgO$ is theoretically 2.53 which, compared to values for most domestic acid products, results in a slight excess of aluminum fluoride values above that required for the quantity of MgO. The test data demonstrate that excess aluminum fluoride (above that required for precipitation as the magnesium salt) will precipitate as the calcium dimorph, $CaAl_2F_8.2H_2O$, as the required calcium is furnished by the associated calcium sulfate hemihydrate phase.

In order that those skilled in the art may better understand how the present invention can be practiced and more fully and definitely understood, the following examples are given by way of illustration and not necessarily by way of limitation.

EXAMPLE I

The following example is offered to illustrate the extremely low level of impurity concentration that can be obtained in strong wet-process phosphoric acids when the iron concentration is at or near 3.0 percent $Fe_2O_3$. The data in table III below show two acids that differ only in $Fe_2O_3$ content (1.7 percent vs. 3.2 percent).

While significant purification of $Al_2O_3$ and MgO was obtained at 1.7 percent $Fe_2O_3$ (sample B), the degree of purification (sample A) at 3.2 percent $Fe_2O_3$ is sufficiently improved to recommend about 3 percent $Fe_2O_3$ as the most preferred value with an extrapolated value of 3.5 percent $Fe_2O_3$ as the maximum in the preferred range of 2.5 to 3.5. Support of this is in table IV, sample C, which shows that there is room for still more improvements at $Fe_2O_3$ values above 3.3 percent, albeit small.

TABLE III

Effect of Iron on Cation Impurities in Strong Wet-Process Phosphoric Acid

Chemical Composition of Strong Acids

| | $P_2O_5$ | $Fe_2O_3$ | $Al_2O_3$ | MgO | $SiO_2$ | $Na_2O$ | $K_2O$ | F | CaO | $SO_3$ | Total precipitated solids |
|---|---|---|---|---|---|---|---|---|---|---|---|
| Sample A | | | | | | | | | | | |
| Acid as prepared | 45 | 3.0 | 1.5 | 0.4 | 0.5 | 0.5 | 0.1 | 4.0 | — | 0.5 | — |
| Filtrate analysis | 45.8 | 3.2 | 0.14 | 0.02 | 0.36 | 0.04 | 0.04 | 1.05 | 0.03 | 1.8 | 6.7 |
| Sample B | | | | | | | | | | | |
| Acid as prepared | 45 | 1.5 | 1.5 | 0.4 | 0.5 | 0.5 | 0.1 | 4.0 | — | 0.5 | — |
| Filtrate analysis | 47.3 | 1.7 | 0.44 | 0.23 | 0.40 | 0.07 | 0.07 | 1.7 | 0.12 | 2.0 | 3.0 |

Referring now more specifically to table III above taken in consideration with what is shown by the analysis of variance (table I), the additional iron in sample A reduced the impurity levels in a unique manner. Notice that sample B has a higher impurity content even though the fluoride level is higher. The teachings of U.S. Pat. Nos. 4,299,804 and 3,642,439, supra, indicate that the opposite effect should be found; however, these teachings did not consider the catalytic effect and necessity of ferric iron to maximize precipitation. As can be determined chemically, the clear acid product for sample A can now be treated according to the teachings of Gilbert, supra, with 1.16 percent of $K_2O$ (0.59 percent for precipitation of $Fe_3KH_{14}(PO_4)_8.4H_2O$ and 0.57 percent for precipitation of $K_2SiF_6$) which will reduce the $Fe_2O_3$ percent, the Si to about 0.1 percent and the residual F to 0.3 percent by the precipitation of $Fe_3KH_{14}(PO_4)_8.4H_2O$ and $K_2SiF_6$. At the same time, a calcium amendment of 1.2 percent CaO will remove the final 1.8 percent $SO_3$ to give an extremely high purity product. As described in Gilbert's teachings, the major component of this final solid mixture is $Fe_3KH_{14}(PO_4)_8.4H_2O$, a highly desirable, high analysis fertilizer suitable for plant growth.

EXAMPLE II

This example is similar to example I above except the MgO content is increased to 1.0 percent to show that 1.5 percent $Al_2O_3$ is a sufficient quantity to remove up to 0.89 percent MgO. These results are shown in table IV below where again, for comparison, the consequence of having a low $Fe_2O_3$ concentration is also demonstrated in sample D, which is exactly like sample C except for 1.5 percent $Fe_2O_3$ instead of 3.0 percent, as recommended. Again the high fluorine level of 2.14 percent in sample D will not reduce the $Al_2O_3$ and MgO below 0.66 and 0.49 percent, respectively, as taught by U.S. Pat. Nos. 4,299,804 and 3,642,439, supra.

TABLE IV

Effect of Iron on Cation Impurities in Strong Wet-Process Acid

| | Chemical Composition of Strong Acids | | | | | | | | | | |
|---|---|---|---|---|---|---|---|---|---|---|---|
| | $P_2O_5$ | $Fe_2O_3$ | $Al_2O_3$ | MgO | $SiO_2$ | $Na_2O$ | $K_2O$ | F | CaO | $SO_3$ | Total precipitated solids |
| Sample C | | | | | | | | | | | |
| Acid as prepared | 45 | 3.0 | 1.5 | 1.0 | 0.5 | 0.5 | 0.1 | 4.0 | — | 0.5 | — |
| Filtrate analysis | 46.1 | 3.3 | 0.19 | 0.11 | 0.32 | 0.06 | 0.03 | 0.97 | 0.12 | 1.0 | 5.5 |
| Sample D | | | | | | | | | | | |
| Acid as prepared | 45 | 1.5 | 1.5 | 1.0 | 0.5 | 0.5 | 0.1 | 4.0 | — | 0.5 | — |
| Filtrate analysis | 46.4 | 1.7 | 0.66 | 0.49 | 0.39 | 0.06 | 0.07 | 2.14 | 0.16 | 0.92 | 3.1 |

EXAMPLE III

One of the characteristics of strong wet acid production is the presence of a large excess of $CaSO_4.0.5H_2O$ in the solid phase. This salt is capable of furnishing either calcium or sulfate ions to competing reactions if the secondary precipitate is less soluble. This is exactly what occurs in these acid systems when the magnesium values are insufficient to combine with the aluminum for the precipitation of $MgAl_2F_8.2H_2O$. Since these equilibrium cells were prepared to have 0.5 percent $SO_3$ in excess of the solubility of $CaSO_4$, the $SO_3$ analysis relative to the CaO values will indicate the extent of incongruent dissolution. For example, the $SO_3$—CaO relationship for samples A, B, C, and D (tables III and IV, supra) shows that more calcium co-precipitated as $(Ca,Mg)Al_2F_8.2H_2O$ at low MgO values (samples A and B) than at higher MgO (samples C and D). The high $SO_3$ analyses for these liquid acids were compensated by a high weight percent of $CaAl_2F_8.2H_2O$ in the equilibrating solid phases. Thus, when the quantity of MgO is insufficient to precipitate all the $Al_2O_3$, calcium is available for this purpose from the main filter cake component, $CaSO_4.0.5\ H_2O$.

EXAMPLE IV

This example is offered to demonstrate the application of the instant invention to acids containing cation impurities at concentrations well above those normally encountered in commercial wet-acid products. A high level of cation impurities creates an imbalance in the ratio of dissolved cations to the natural fluorine values of the phosphate rock. The two samples shown in table V below differ only in $Al_2O_3$ content and both contain high levels of the other cation impurities.

strates the need for fluorine in excess of that present in the phosphate rock. The stoichiometric fluorine requirement for precipitation of the residual impurities in sample E, as compared to the final analysis of sample F, is 1.68 percent. As prepared for this test, the level of impurities in sample E are comparable, or even higher, than those found in typical sludge acid fractions or in residues after wet-acid purification processes have been applied. These byproduct sludge acids result from the teachings of U.S. Pat. No. 3,967,948 (McCullough's urea phosphate), U.S. Pat. No. 3,914,382 (T. A. Williams' solvent extraction), and U.S. Pat. No. 3,890,097 (J. T. Moore's $H_3PO_4$ crystallization). Thus, the present process of catalyzing the natural precipitation of impurities with iron can be applied to impure acid sludges if an external fluorine source is available to maintain a mole ratio of $F/Al_2O_3$ of about 8. This value of about 8 is necessary to fulfill the fluorine requirements for the compound $(Ca,Mg)Al_2F_8.2H_2O$, where 8 moles of fluorine are required for 2 moles of aluminum. On a weight percent basis, the ratio of wt.% fluorine/wt.% $Al_2O_3$ in the magnesium form of the compound is 58.0/38.9 or 1.49. Now referring to tables III, IV, and V, the final fluoride concentration required when maximum removal of aluminum, magnesium, silica, sodium, and potassium has been obtained is about 1.0 percent. Note that in table III 1.05 percent F (residue) produced good purification as opposed to 1.7 being too much; in table IV, 0.97 percent F (residue) is equally effective whereas in table V (sample F), 0.71 percent F is insufficient and allows 0.4 percent $Al_2O_3$ and 0.12 percent MgO to remain in solution. Thus, an equation can be derived establishing the most preferred fluoride level.

$$Wt\%F = 1.49\ wt\%\ Al_2O_3 + 1.0$$

TABLE V

Effect of Insufficient Fluoride for Precipitation of $(Ca,Mg)Al_2Fe_8.2H_2O$

| | Chemical Composition of Strong Wet-Process Phosphoric Acid | | | | | | | | | | |
|---|---|---|---|---|---|---|---|---|---|---|---|
| | $P_2O_5$ | $Fe_2O_3$ | $Al_2O_3$ | MgO | $SO_2$ | $Na_2O$ | $K_2O$ | F | CaO | $SO_3$ | Total precipitated solids |
| Sample E | | | | | | | | | | | |
| Acid as prepared | 45 | 3.0 | 3.0 | 1.0 | 1.0 | 1.0 | 0.4 | 4.0 | — | 0.5 | — |
| Filtrate analysis | 48.2 | 1.9 | 3.4 | 1.0 | 0.05 | 0.23 | 0.13 | 3.5 | 0.18 | 0.7 | 12.2 |
| Sample F | | | | | | | | | | | |
| Acid as prepared | 45 | 3.0 | 1.5 | 1.0 | 1.0 | 1.0 | 0.4 | 4.0 | — | 0.5 | — |
| Filtrate analysis | 47.2 | 2.0 | 0.4 | 0.12 | 0.05 | 0.04 | 0.07 | 0.71 | 0.12 | 0.8 | 11.2 |

Referring now more specifically to table V above, it will be appreciated that in sample E, the higher level of aluminum has essentially prevented the precipitation of $(Ca,Mg)Al_2F_8.2H_2O$ as predicted by the statistical analysis of all the data in table I, supra. Notice that the large excess of impurities in sample E has exceeded the capacity of the fluorine requirement for complete precipitation of $(Ca,Mg)Al_2F_8.2H_2O$ and $NaSiF_6$. As those skilled in the art already know, this sample demon- In this equation, the constant 1.0 has a preferred value of 0.9 to 1.1, but as the tables demonstrate, the equation and process is still acceptably operable from about 0.7 to 1.3. The test data demonstrate, as shown in example III above, the calcium from the ever present $CaSO_4.0.5$-

$H_2O$ is available in the event that magnesium is depleted and $Al_2O_3$ is still a major impurity component.

EXAMPLE V

This example is presented to demonstrate the strong interaction between fluorine and iron with respect to the precipitation of the cation impurities and may be better understood with reference to table VI below.

effective in reducing the cation impurities ($Al_2O_3$+$MgO$+$SiO_2$+$Na_2O$+$K_2O$+$CaO$) from 1.94 percent to 0.9 percent.

EXAMPLE VI

The data in table VII infra is given primarily to show the importance of recycled off-gas fluorine values to the acid system and confirm the effect shown in Example

TABLE VI

Interaction of Iron and Fluorine on Types of Precipitated Solids

Wt. % Precipitated in Each Cell (based on analysis of solids)

| Sample | $(Al,Fe)_3KH_{14}(PO_4)_8 \cdot 4H_2O$ | $(K,Na)_2SiF_6$ | $(Ca,Mg)Al_2F_8 \cdot 2H_2O$ |
|---|---|---|---|
| 66 (2% F) | 4.61 | .86 | .73 |
| 17 (4% F) | .22 | 1.29 | 3.08 |

Composition of Liquid Phase

| 66 (2% F) | $Fe_2O_3$ | $Al_2O_3$ | MgO | $SiO_2$ | $Na_2O$ | $K_2O$ | CaO | F | $P_2O_5$ | $SO_3$ | Total precipitated solids |
|---|---|---|---|---|---|---|---|---|---|---|---|
| As prepared | 1.5 | 1.5 | 0.4 | 0.5 | 0.5 | 0.4 | — | 2% | 45 | 0.5 | — |
| Filtrate analysis | 1.14 | 1.35 | 0.16 | 0.03 | 0.07 | 0.28 | 0.05 | 0.56 | 57.7 | 0.49 | 6.69 |
| 17 (4% F) | | | | | | | | | | | |
| As prepared | 1.5 | 1.5 | 0.4 | 0.5 | 0.5 | 0.4 | — | 4% | 45 | 0.5 | — |
| Filtrate analysis | 1.8 | 0.42 | 0.16 | 0.11 | 0.09 | 0.08 | 0.04 | 1.36 | 49.8 | 1.5 | 4.7 |

Both samples in table VI above were prepared alike except sample No. 66 had only 2 percent F; whereas sample No. 17 had 4 percent F (4 percent represents the fluoride values when off-gas scrubber solutions are recycled to the process; whereas about 2 percent F would be obtained if the $SiF_4$ were lost to the atmosphere). Two benefits are obtained by recycling the off-gas fluorine scrubber liquid. Fluorine acts as a sequestrant for ferric iron in strong phosphoric acids. Notice in table VI that 4.61 percent $(Fe,Al)_3KH_{14}(PO_4)_8 \cdot 4H_2O$ precipitates from the equilibrium cell where 2 percent F was originally charged, but only 0.22 percent precipitated at 4 percent fluorine. Table VI shows that this precipitation which represents a significant phosphate loss in the hemihydrate filter cake is reduced by an increase in soluble fluorine values of only 0.80 percent (1.36–0.56) to a negligible level of 0.22 percent (well within the error of possible chemical analysis). The analysis of variance in table II above shows that this effect holds for all the samples in the study. As a consequence of this fluorine sequestration of iron which was also disclosed as being effective in ammoniated liquid fertilizers (U.S. Pat. No. 3,711,268, Frazier's sequestration ratio), the solubilized iron (1.8 percent vs. 1.14 percent) again acts as a catalyst for the precipitation of $(Ca,Mg)Al_2F_8 \cdot 2H_2O$ (0.73 percent compared to 3.08 percent). Note also that 1.8 percent $Fe_2O_3$, rather than the recommended quantity of 3.0 percent, was still V, supra; this effect being the ability of fluorine to prevent phosphate precipitates (with subsequent loss) from forming in the byproduct calcium sulfate hemihydrate filter cake.

TABLE VII

Sequestration of Fe and $P_2O_5$ by Fluorine in Strong Wet-Process Phosphoric Acid Wt. % Precipitated in Equilibrium Cell

| Sample No. | $(Al, Fe)_3KH_{14}(PO_4)_8 \cdot 4M_2O$ | $(K,Na)_2SiF_6$ | $(Ca,Mg)Al_2F_8 \cdot 2H_2O$ |
|---|---|---|---|
| 72 (2% F) | 7.79 | 0.56 | 1.09 |
| 2 (4% F) | 0.73 | 0.77 | 0.86 |

Composition of Liquid Phase

| 72 (2% F) | $Fe_2O_3$ | $Al_2O_3$ | MgO | $SiO_2$ | $Na_2O$ | $K_2O$ | CaO | F | $P_2O_5$ | $SO_3$ | Precipitated solids |
|---|---|---|---|---|---|---|---|---|---|---|---|
| As prepared | 1.5 | 3.0 | 1.0 | 0.5 | 0.5 | 0.4 | — | 2 | 45 | 0.5 | — |
| Filtrate analysis | 0.75 | 4.02 | 1.02 | 0.02 | 0.14 | 0.14 | 0.04 | 1.09 | 53.5 | 0.49 | 10.94 |
| 2 (4% F) | | | | | | | | | | | |
| As prepared | 1.5 | 3.0 | 1.0 | 0.5 | 0.5 | 0.4 | — | 4 | 45 | 0.5 | — |
| Filtrate analysis | 1.5 | 2.8 | 0.88 | 0.23 | 0.06 | 0.19 | 0.17 | 2.9 | 46.4 | 1.1 | 2.7 |

Referring now more specifically to table VII above, it will be appreciated that the final fluorine values of the two samples differ by 1.81 percent (2.9–1.09) whereas the reduction in weight percent of the phosphate solids precipitated was 7.06 percent (7.79–0.73) Comparable figures from table VI above are 4.39 percent less (Fe,$AL)_3KH_{14})_8 \cdot 4H_2O$ for an increase of 0.8 percent F. Averaging these figures $$\left[ \frac{7.06}{1.81} + \frac{4.39}{0.8} \right] / 2 = 4.7$$

shows that 1 percent F will sequester 4.7 percent of the phosphate salt.

After sifting the data supra, as well as other results of tests and operation of our new, novel, and improved method for the purification of wet-process phosphoric acid by means of precipitation of substantially all of the congeneric impurities comprising CaO, $SO_3$, $Fe_2O_3$, $Al_2O_3$, $K_2O$, $Na_2O$, MgO, $SiO_2$, and F, we now present the acceptable and preferred parameters and variables as shown below.

| Multi-Stage Purification Procedure for Wet-Process Phosphoric Acid | | | |
|---|---|---|---|
| Variables | Operational range | Preferred range | Most preferred range |
| First and second stages[1,2] | | | |
| $Fe_2O_3$, wt % | 2.5–5 | 2.5–3.5 | 3.0 |
| Wt % fluorine | 1.5 × wt % $Al_2O_3$ + (0.7–1.3) | 1.5 wt % $Al_2O_3$ + (0.9–1.1) | 1.5 wt % $Al_2O_3$ + 1.0 |
| $Al_2O_3$: MgO weight ratio | 2–10 | 2.53–4 | About 2.53 |
| Retention time, hours | 1–6 | 1–3 | 2 |
| Temperature of slurry, °C. | 80–130 | 90–100 | 90 |
| Third stage[3] | | | |
| Soluble potassium source, wt % $K_2O$ | 0.6–4.0 | 0.6–2.0 | 0.6–1.0 |
| Retention time, hours | 0.2–10 | 0.4–2.0 | 1.0 |
| Temperature of slurry, °C. | 0–100 | 0–40 | 25 |

[1]The adjustments in the amount of ferric iron and fluorine are intended to effect precipitation of the two crystalline compounds, to wit, $(Na,K)_2SiF_6$ and $(Ca,Mg)Al_2F_8.2H_2O$ as well as calcium sulfate hemihydrate in the filter cake. The fluorine recycle adjustment is also effective in minimizing the precipitation of $(Fe,Al)_3KH_{14}(PO_4)_8.4H_2O$, $AlHPO_4F.2H_2O$ and $Al(H_2PO_4)_2F$.
[2]An aluminum and fluorine ratio adjustment may be required to apply the teachings to sludge acids or acids usually high in magnesium.
[3]This adjustment of potassium in the third stage effects the precipitation of the crystalline compounds $(Fe,Al)_3KH_{14}(PO_4)_8.4H_2O$ and $K_2SiF_6$.

It will now be appreciated that the instant invention is concerned principally with the purification of wet-process phosphoric acid. One embodiment of the instant invention is to effect the purification of acids at the producer level; i.e., during the very act of formation of the phosphoric acid by any of the three above described methods, to wit, dihydrate, hemihydrate, and anhydrite. It has already been noted that this invention occurs naturally to a small, uncontrolled degree during the pilot plant production of strong acid by a continuous process at 1 to 1.5 hours retention time. In this embodiment, we have directed our principal attention to a treatment of such acids at the producer level following the hemihydrate process procedures. Since the hemihydrate process, as well as others, can be performed in a single vessel as well as in multiple stages, which single or multiple vessels in turn can be either a single cavity or a plurality of partitions, it should be appreciated that in the table of variables above, the first and second stage connotations are directed to the application of the instant invention as applied to and improved upon the prior-art processes. Thus, regardless of whether the acid as produced is formed in one or more vessels, the first and second stages of the instant invention are principally directed to the adjustment of the ferric iron and fluorine levels to precipitate out, with the calcium sulfate hemihydrate, principally all of the congeneric impurities other than the iron, fluorine, and sulfate. After these impurities are precipitated and removed by means of filtration, the third stage of the instant invention is put into practice wherein soluble potassium materials are added to the producer acid to effect removal of the iron and silicon by precipitation of the crystalline compounds, $(Fe,Al)_3KH_{14}(PO_4)_8.4H_2O$ and $K_2SiF_6$. Similarly, a soluble calcium souce will remove the final sulfate values as calcium sulfate, the form of which (dihydrate, hemihydrate, or anhydrite) will depend on the temperature. In this embodiment of the invention, the required fluorine is added by means of scrubbing the off-gases from the producer process, for example, the hemihydrate process, and returning the resulting recovered fluorine to the slurry. Also, as noted above, any soluble source of ferric iron may be added as well as perhaps scrap iron in conjunction with oxidizing material.

In another embodiment of the invention wherein the phosphoric acid has already been produced and received, for example, in the form of merchant-grade acid, it may be necessary in some instances to use such a material as feed in the production of detergents. Under such circumstances, the cost benefit ratio may well be favorable for going to the expense of adding the necessary amounts of fluorine, ferric iron, and soluble potassium thereto to remove substantially all of the congeneric impurities therein. In such a case, two of the stages outlined in the table above can be followed, albeit such a procedure would be much more costly than performing the steps comprising the instant invention at the producer level.

While we have shown and described particular embodiments of our invention, modifications and variations thereof will occur to those skilled in the art. We wish it to be understood, therefore, that the appended claims are intended to cover such modifications and variations which are within the true scope and spirit of our invention.

What we claim as new and desire to secure by Letters Patent of the United States is:

1. In an improved process for the preparation of purified strong phosphoric acid containing greater than about 40 weight percent $P_2O_5$ by the wet process wherein:

A. phosphate rock and phosphoric acid are added to a first reaction zone, said first reaction zone containing a first slurry containing the congeneric impurities comprising $Fe_2O_3$, $Al_2O_3$, MgO, and F, and said first slurry comprising calcium sulfate, monocalcium phosphate, phosphoric acid, and dissolved calcium, wherein said added phosphate rock is converted to monocalcium phosphate, calcium sulfate, and phosphoric acid, and wherein said first slurry is maintained at a soluble sulfate concentration less than the stoichiometric amount required for the formation of calcium sulfate;

B. sulfuric acid is added to a second reaction zone which contains a second slurry containing said congeneric impurities as said first slurry, supra, and said second slurry comprising calcium sulfate, monocalcium phosphate, phosphate rock, and sulfuric acid, wherein said sulfuric acid is reacted with monocalcium phosphate and said phosphate rock to effect the formation of calcium sulfate and phosphoric acid, and second slurry being maintained at a temperature in the range from about 80° C. to about 130° C. for a period of time ranging from about 1 to about 6 hours, and said second slurry being maintained at a soluble sulfate concentration greater than the stoichiometric amount required for the formation of calcium sulfate with the dissolved calcium;

C. a portion of said first slurry is caused to be in intimate contact with at least a portion of said second slurry and simultaneously therewith a portion of said second slurry is caused to be in intimate contact with at least a portion of said first slurry; and D. a portion of said second slurry, separate from said portion thereof in intimate contact with said first slurry, is introduced into separating means wherefrom is recovered as the liquid product, wet-process phosphoric acid, and as the solid byproduct, calcium sulfate hemihydrate, to wit, $CaSO_4 \cdot 0.5 H_2O$;

the improvement in combination therewith for both effecting desirable environmental fluorine evolution abatement and for eminently improving on the wet acid product purification as it relates to certain congeneric impurities originally present therein, which improvement comprises the steps of:

(1) adjusting the $Al_2O_3$:$MgO$ weight ratio of said first slurry to the range of between about 2 and about 10;

(2) adjusting the $Fe_2O_3$ concentration of said first slurry to a range of between about 2.5 and about 5.0 percent by weight to effect the precipitation therein of the two crystalline compounds $(Na,K)_2SiF_6$ and $(Ca,Mg)Al_2F_8 \cdot 2H_2O$, said $Fe_2O_3$ functioning as a catalyst;

(3) adjusting the fluorine concentration of said second slurry to the range of between about $1.5 \times wt \% \ Al_2O_3 + 0.7$ to about $1.5 \times wt \% \ Al_2O_3 + 1.3$ percent by weight to subsequently prevent precipitation therein of $(Fe,Al)_3KH_{14}(PO_4)_8 \cdot 4H_2O$ and to effect the precipitation therein of the crystalline compounds $(Ca,Mg)Al_2F_8 \cdot 2H_2O$ and $(Na,K)_2SiF_6$;

(4) maintaining the temperature of said second slurry in the range between about 80° C. to about 130° C. for a period of time ranging from about 1 hour to about 6 hours; and (5) subsequently introducing at least a portion of said second slurry into separating means to effect removal therefrom of $CaSO_4 \cdot 0.5H_2O$ and said precipitated compounds $(Na,K)_2SiF_6$ and $(Ca,Mg)Al_2F_8 \cdot 2H_2O$;

said improved process characterized by the fact that the concentration of the wet-process phosphoric acid congeneric impurities comprising $Al_2O_3$ and $MgO$ are reduced therein in the range from about 30 to about 90 percent.

2. The process of claim 1 wherein:
(1) the adjustment of the $Al_2O_3$:$MgO$ weight ratio of said first slurry is to the range of between about 2.53 and about 4;
(2) the adjustment of the $Fe_2O_3$ catalyst concentration of said first slurry is to the range of between about 2.5 and about 3.5 percent by weight;
(3) the adjustment of the fluorine concentration of said second slurry is to the range of between about $1.5 \times wt \% \ Al_2O_3 + 0.9$ to about $1.5 \times wt \% \ Al_2O_3 + 1.1$ percent by weight; and
(4) the temperature of said second slurry is maintained in the range of between about 90° C. for a period of time ranging from about 1 hour to about 3 hours;

said improved process characterized by the fact that the concentration of the wet-process phosphoric acid congeneric impurities comprising $Al_2O_3$ and $MgO$ are reduced therein in the range from about 70 to about 90 percent.

3. The process of claim 1 wherein:
(1) the adjustment of the $Al_2O_3$:$MgO$ weight ratio of said first slurry is to about 2.53;
(2) the adjustment of the $Fe_2O_3$ catalyst concentration of said first slurry is to about 3.0 percent by weight;
(3) the adjustment of the fluorine concentration of said first slurry is about $1.5 \times wt \% \ Al_2O_3 + 1.0$ percent by weight; and
(4) the temperature of said second slurry is maintained at about 90° C. for a period of about 2 hours;

said improved process characterized by the fact that the concentration of the wet-process phosphoric acid congeneric impurities comprising $Al_2O_3$ and $MgO$ are reduced therein to about 90 percent.

4. The process of claim 1 wherein the source of fluorine for said amendment to said second slurry is the off-gas from said first and second slurries.

5. The process of claim 1 wherein a substantial amount of the source for said fluorine amendment to said second slurry is the off-gas from said first and second slurries.

6. In an improved process for the preparation of purified strong phosphoric acid containing greater than about 40 percent $P_2O_5$ by the wet process wherein phosphate rock and sulfuric acid are introduced into a reaction zone wherein is maintained a reaction slurry, said reaction slurry containing the congeneric impurities comprising $Fe_2O_3$, $Al_2O_3$, $MgO$, and F, and said slurry comprising phosphoric acid, sulfuric acid, monocalcium phosphate, dissolved calcium and calcium sulfate to effect the formation of a product slurry containing said congeneric impurities as said reaction slurry, supra, and said product slurry comprising phosphoric acid and calcium sulfate and wherefrom at least a portion of said reaction product slurry is selected for separation of a liquid fraction comprising phosphoric acid product and a solid fraction comprising calcium sulfate byproduct, the improvement for both effecting desirable environmental fluorine evolution abatement and for eminently improving on the wet acid product purification as it relates to certain congeneric impurities originally present therein, which improvement comprises the steps of:

(1) adjusting the $Al_2O_3$:$MgO$ weight ratio of said reaction slurry to the range of between about 2 and about 10;
(2) adjusting the $Fe_2O_3$ concentration of said reaction slurry to a range of between about 2.5 to about 5 percent by weight to effect the precipitation therein of the two crystalline compounds $(Na,K)_2SiF_6$ and $(Ca,Mg)Al_2F_8 \cdot 2H_2O$, said $Fe_2O_3$ functioning as a catalyst;
(3) adjusting the fluorine concentration of the resulting product slurry from step 2 supra to the range of between about $1.5 \times wt \% \ Al_2O_3 + 0.7$ to about $1.5 \times wt \% \ Al_2O_3 + 1.3$ percent by weight to subsequently prevent precipitation therein of $(Fe,Al)_3KH_{14}(PO_4)_8 \cdot 4H_2O$ and to effect the precipitation therein of the crystalline compounds $(Na,K)_2SiF_6$ and $(Ca,Mg)Al_2F_8 \cdot 2H_2O$;
(4) maintaining the temperature of said product slurry in the range between about 80° C. and about 130° C. for a period of time ranging from about 1 hour to about 6 hours; and (5) subsequently introducing at least a portion of said product slurry into separating means to effect removal of $CaSO_4.0.5H_2O$ and said precipitated compounds $(Na,K)_2SiF_6$ and $(Ca,Mg)Al_2F_8.2H_2O$;

said improved process characterized by the fact that the concentration of the wet-process phosphoric acid congeneric impurities comprising $Al_2O_3$ and MgO are reduced therein in the range from about 30 to about 90 percent 7. The process of claim 6 wherein:
  (1) the adjustment of the $Al_2O_3$:MgO weight ratio of said reaction slurry is to the range of between about 2.53 and about 4;
  (2) the adjustment of the $Fe_2O_3$ catalyst concentration of said reaction slurry is to the range of between about 2.5 and about 3.5 percent by weight;
  (3) the adjustment of the fluorine concentration of the resulting product slurry is to the range of between about $1.5 \times$ wt % $Al_2O_3 + 0.9$ to about $1.5 \times$ wt % $Al_2O_3 + 1.1$ percent by weight; and
  (4) the temperature of said product slurry is maintained in the range of between about 90° C. and about 100° C. for a period of from about 1 hour to about 3 hours;

said improved process characterized by the fact that the concentration of the wet-process phosphoric acid congeneric impurities comprising $Al_2O_3$ and MgO are reduced therein to the range from about 70 to about 90 percent.

8. The process of claim 6 wherein:
  (1) the adjustment of the $Al_2O_3$:MgO weight ratio of said reaction slurry is to about 2.53;
  (2) the adjustment of the $Fe_2O_3$ catalyst concentration of said reaction slurry is to about 3.0 percent by weight;
  (3) the adjustment of the fluorine concentration of the resulting product slurry is to about $1.5 \times$ wt % $Al_2O_3 + 1.0$ percent by weight; and
  (4) the temperature of said product slurry is maintained at about 90° C. for a period of time of about 2 hours;

said improved process characterized by the fact that the concentration of the wet-process phosphoric acid congeneric impurities comprising $Al_2O_3$ and MgO are reduced therein by about 90 percent.

9. The process of claim 6 wherein the source of said fluorine amendment for said product slurry is the off-gas from said reaction slurry.

10. The process of claim 6 wherein a substantial amount of said source of said fluorine amendment for said product slurry is the off-gas from said reaction slurry.

11. A process for the purification of wet-process phosphoric acid containing from about 40 to about 55 weight percent $P_2O_5$ and containing the congeneric impurities normally present therein including $Fe_2O_3$, $Al_2O_3$, MgO, and F, which process comprises the steps of:
  (1) adjusting the $Al_2O_3$:MgO weight ratio of said wet-process phosphoric acid to the range of about 2 to about 10;
  (2) adjusting the $Fe_2O_3$ concentration of said wet-process phosphoric acid to the range of about 2.5 to about 5 percent by weight to effect the precipitation therein of the two crystalline compounds $(Na,K)_2SiF_6$ and $(Ca,Mg)Al_2F_8.2H_2O$, said $Fe_2O_3$ functioning as a catalyst;
  (3) adjusting the fluorine concentration of said wet-process phosphoric acid to the range of about $1.5 \times$ wt % $Al_2O_3 + 0.7$ to about $1.5 \times$ wt % $Al_2O_3 + 1.3$ percent by weight to subsequently prevent precipitation therein of $(Fe,Al)_3KH_{14}(PO_4)_8.4H_2O$ and to effect the precipitation therein of the crystalline compounds $(Ca,Mg)Al_2F_8.2H_2O$ and $(Na,K)_2SiF_6$;
  (4) maintaining the temperature of said wet-process phosphoric acid in the range between about 80° C. and about 130° C. for a period of time in the range between about 1 hour and about 6 hours; and
  (5) subsequently introducing at least a portion of said wet-process phosphoric acid into separating means to effect removal therefrom of $CaSO_4.0.5H_2O$ and said precipitated compounds $(Na,K)_2SiF_6$ and $(Ca,Mg)Al_2F_8.2H_2O$;

said improved process characterized by the fact that the concentration of the wet-process phosphoric acid congeneric impurities comprising $Al_2O_3$ and MgO are reduced therein in the range from about 30 to about 90 percent.

12. The process of claim 11 wherein:
  (1) the adjustment of the $Al_2O_3$:MgO weight ratio of said wet-process phosphoric acid is to the range of about 2.53 to about 4;
  (2) the adjustment of the $Fe_2O_3$ catalyst concentration of said wet-process phosphoric acid is to the range of about 2.5 to about 3.5 percent by weight;
  (3) the adjustment of the fluorine concentration of said wet-process phosphoric acid is to the range of between about $1.5 \times$ wt % $Al_2O_3 + 0.9$ to about $1.5 \times$ wt % $Al_2O_3 + 1.1$ percent by weight; and
  (4) the temperature of said wet-process phosphoric acid is maintained in the range of between about 90° C. and about 100° C. for a period of time from about 1 hour to about 3 hours; and said improved process further characterized by the fact that the concentration of the wet-process phosphoric acid congeneric impurities comprising $Al_2O_3$ and MgO are reduced therein in the range from about 70 to about 90 percent.

13. The process of claim 11 wherein:
  (1) the adjustment of the $Al_2O_3$:MgO weight ratio of said wet-process phosphoric acid is about 2.53;
  (2) the adjustment of the $Fe_2O_3$ catalyst concentration of said wet-process phosphoric acid is to about 3.0 percent by weight;
  (3) the adjustment of the fluorine concentration of said wet-process phosphoric acid is to about $1.5 \times$ wt % $Al_2O_3 + 1.0$ percent by weight; and
  (4) the temperature of said wet-process phosphoric acid is maintained at about 90° C. for about 2 hours;

said improved process further characterized by the fact that the concentration of the wet-process phosphoric acid congeneric impurities comprising $Al_2O_3$ and MgO are reduced therein by about 90 percent.

14. In an improved process for the preparation of purified strong phosphoric acid containing greater than about 40 weight percent $P_2O_5$ by the wet-process method wherein:
  A. phosphate rock and phosphoric acid are added to a first reaction zone, said first reaction zone containing a first slurry, said first slurry containing the congeneric impurities comprising $Fe_2O_3$, $Al_2O_3$, MgO, $K_2O$ and F, and said first slurry comprising calcium sulfate, monocalcium phosphate, phosphoric acid, and dissolved calcium, wherein said added phosphate rock is converted to monocalcium phosphate, calcium sulfate, and phosphoric acid, and wherein said first slurry is maintained at a soluble sulfate concentration less than the stoichlometric amount required for the formation of calcium sulfate;

B. sulfuric acid is added to a second reaction zone which contains a second slurry containing said congeneric impurities as said first slurry, supra, and said second slurry comprising calcium sulfate, monocalcium phosphate, phosphate rock, and sulfuric acid wherein said sulfuric acid is reacted with monocalcium phosphate and said phosphate rock to effect the formation of calcium sulfate and phosphoric acid, said second slurry being maintained at a temperature ranging from about 80° C. to about 130° C. for a period of time ranging from about 1 hour to about 6 hours, and said second slurry being maintained at a soluble sulfate concentration greater than the stoichiometric amount required for the formation of calcium sulfate with the dissolved calcium;

C. a portion of said first slurry is caused to be in intimate contact with at least a portion of said second slurry and simultaneously therewith a portion of said second slurry is caused to be in intimate contact with at least a portion of said first slurry; and D. a portion of said second slurry, separate from said portion thereof in intimate contact with said first slurry, is introduced into separating means wherefrom is recovered, as the liquid product, wet-process phosphoric acid and, as the solid byproduct, calcium sulfate hemihydrate, to wit, $CaSO_4.0.5H_2O$;

the improvement in combination therewith for both effecting desirable environmental fluorine evolution abatement and for eminently improving on the wet acid product purification as it relates to certain congeneric impurities originally present therein, which improvement comprises the steps of:

(1) adjusting the $Al_2O_3:MgO$ weight ratio of said first slurry to the range of between about 2 and about 10;

(2) adjusting the $Fe_2O_3$ concentration of said first slurry to a range of between about 2.5 and about 5.0 percent by weight to effect the precipitation therein of the two crystalline compounds $(Na,K)_2SiF_6$ and $(Ca,Mg)Al_2F_8.2H_2O$, said $Fe_2O_3$ functioning as a catalyst;

(3) adjusting the fluorine concentration of said second slurry to the range of between about $1.5 \times wt \% Al_2O_3 + 0.7$ to about $1.5 \times wt \% Al_2O_3 + 1.3$ percent by weight to subsequently prevent precipitation therein of $(Fe,Al)_3KH_{14}(PO_4)_8.4H_2O$ and to effect the precipitation therein of the crystalline compounds $(Ca,Mg)Al_2F_8.2H_2O$ and $(Na,K)_2SiF_6$;

(4) maintaining the temperature of said second slurry in the range between about 80° C. to about 130° C. for a period of time ranging from about 1 hour to about 6 hours;

(5) subsequently introducing at least a portion of said slurry into first separating means to produce therein a liquid fraction and a solid fraction and to effect removal in said solid fraction $CaSO_4.0.5H_2O$ and said precipitated compounds $(Na,K)_2SiF_6$ and $(Ca,Mg)Al_2F_8.2H_2O$, and said liquid fraction having a congeneric impurity $K_2O$ weight percent of about 0.1;

(6) adjusting the soluble potassium concentration of the liquid fraction removed from said first separating means in step (5) supra to a range of between about 0.6 and about 4.0 weight percent $k_2O$ to effect precipitation therein of the two crystalline compounds $(Fe,Al)_3KH_{14}(PO_4)_8.4H_2O$ and $(Na,K)_2SiF_6$;

(7) maintaining the temperature of said liquid fraction as amended in step (6) supra in a temperature range of about 0° C. to about 100° C. for a period of time ranging from about 0.2 to about 10 hours; and (8) introducing at least a portion of the resulting slurry from step (7) supra into second separating means to remove therefrom said precipitated compounds $(Fe,Al)_3KH_{14}(PO_4)_8.4H_2O$ and $(Na,K)_2SiF_6$;

said improved process characterized by the fact that the concentration of the wet-process phosphoric acid congeneric impurities comprising $Al_2O_3$ and MgO are reduced therein in the range from about 30 to about 90 percent.

15. The process of claim 14 wherein:

(1) the adjustment of the $Al_2O_3:MgO$ weight ratio of said first slurry is to the range of between about 2.53 and about 4;

(2) the adjustment of the $Fe_2O_3$ catalyst concentration of said first slurry is to the range of between about 7.5 and about 3.5 percent by weight;

(3) the adjustment of the fluorine concentration of said second slurry is to the range of between about $1.5 \times wt \% Al_2O_3 + 0.9$ to about $1.5 \times wt \% Al_2O_3 + 1.1$ percent by weight;

(4) the temperature of said second slurry is maintained in the range of between about 90° C. and 100° C. for a period of time from about 1 hour to about 3 hours;

(5) the adjustment of the $K_2O$ concentration of said liquid fraction removed from said first separating means is to the range between about 0.6 to about 2; and (6) the temperature of said liquid fraction is maintained at about 0° C. to about 40° C. for a period of time ranging from about 0.4 to about 2 hours;

said improved process further characterized by the fact that the concentration of the wet-process phosphoric acid congeneric impurities comprising $Al_2O_3$ and MgO are reduced therein in the range from about 70 to about 90 percent.

16. The process of claim 14 wherein:

(1) the adjustment of the $Al_2O_3:MgO$ weight ratio of said first slurry is to about 2.53;

(2) the adjustment of the $Fe_2O_3$ catalyst concentration of said first slurry is to about 3.0 percent by weight;

(3) the adjustment of the fluorine concentration of said first slurry is about $1.5 \times wt \% Al_2O_3 + 1.0$ percent by weight;

(4) the temperature of said second slurry is maintained at about 90° C. for a period of about 2 hours;

(5) the adjustment of the $K_2O$ concentration of said liquid fraction removed from said first separating means is to the range of about 0.6 to about 1; and (6) the temperature of said liquid fraction is maintained at about 25° C. for a period of about 1 hour;

said improved process further characterized by the fact that the concentration of the wet-process phorphoric acid acid congeneric impurities comprising $Al_2O_3$ and MgO are reduced therein by about 90 percent.

17. The process of claim 14 wherein the source of fluorine for said amendment to said second slurry is the off-gas from said first and second slurries.

18. The process of claim 14 wherein a substantial amount of the source for said fluorine amendment to said second slurry is the off-gas from said first and second slurries.

19. In an improved process for the preparation of purified strong phosphoric acid containing greater than about 40 weight percent $P_2O_5$ by the wet process wherein phosphate rock and sulfuric acid are introduced into a reaction zone wherein is maintained a reaction slurry, said reaction slurry containing the congeneric impurities comprising $Fe_2O_3$, $Al_2O_3$, MgO, $K_2O$ and F, and said reaction slurry comprising phosphoric acid, sulfuric acid, monocalcium phosphate, dissolved calcium, and calcium sulfate to effect the formation of a product slurry containing said congeneric impurities as said reaction slurry, supra, and said product slurry comprising phosphoric acid and calcium sulfate and wherefrom at least a portion of said reaction product slurry is selected for separation of a liquid fraction comprising phosphoric acid product and a solid fraction comprising calcium sulfate byproduct, the improvement for both effecting desirable environmental fluorine evolution abatement and for eminently improving on the wet acid product purification as it relates to certain congeneric impurities originally present therein, which improvement comprises the steps of:

(1) adjusting the $Al_2O_3$:MgO weight ratio of said reaction slurry to the range of between about 2 and about 10;

(2) adjusting the $Fe_2O_3$ concentration of said reaction slurry to a range of between about 2.5 to about 5 percent by weight to effect the precipitation therein of the two crystalline compounds $(Na,K)_2SiF_6$ and $(Ca,Mg)Al_2F_8.2H_2O$, said $Fe_2O_3$ functioning as a catalyst;

(3) adjusting the fluorine concentration of the resulting product slurry from step (2) supra to the range of between about $1.5 \times$ wt % $Al_2O_3 + 0.7$ to about $1.5 \times$ wt % $Al_2O_3 + 1.3$ percent by weight to subsequently prevent precipitation therein of $(Fe,Al)_{14}(PO_4)_8.4H_2O$ and to effect the precipitation therein of the crystalline compounds $(Ca,Mg)Al_2F_8.2H_2O$ and $(Na,K)_2SiF_6$;

(4) maintaining the temperature of said product slurry in the range between about 80° C. and about 130° C. for a period of time ranging from about 1 hour to about 6 hours; and (5) subsequently introducing at least a portion of said product slurry into first separating means to produce therein a liquid fraction and a solid fraction to effect removal therefrom of $CaSO_4.0.5H_2O$ and said precipitated compounds $(Na,K)_2SiF_6$ and $(Ca,Mg)Al_2F_8.2H_2O$ from said liquid fraction, said liquid fraction having a congeneric impurity $K_2O$ weight percent of about 0.1;

(6) adjusting the soluble potassium concentration of the liquid fraction removed from said first separating means in step (5) supra to a range of between about 0.6 and about 4.0 weight percent $K_2O$ to effect precipitation therein of the two crystalline compounds $(Fe,Al)_3KH_{14}(PO_4)_8.4H_2O$ and $(Na,K)_2SiF_6$;

(7) maintaining the temperature of said liquid fraction as amended in step (6) supra in a temperature range of about 0° C. to about 100° C. for a period of time ranging from about 0.2 to about 10 hours; and (8) introducing at least a portion of the resulting slurry from step (7) supra into second separating means to remove therefrom said precipitated compounds $(Fe,Al)_3KH_{14}(PO_4)_8.4H_2O$ and $(Na,K)_2SiF_6$;

said improved process characterized by the fact that the concentration of the wet-process phosphoric acid congeneric impurities comprising $Al_2O_3$ and MgO are reduced therein in the range from about 30 to about 90 percent.

20. The process of claim 19 wherein:
(1) the adjustment of the $Al_2O_3$:MgO weight ratio of said reaction slurry is to the range of between about 2.53 and about 4.0;
(2) the adjustment of the $Fe_2O_3$ catalyst concentration of said reaction slurry is to the range of between about 2.5 and about 3.5 percent by weight;
(3) the adjustment of the fluorine concentration of the resulting product slurry is to the range of between about $1.5 \times$ wt % $Al_2O_3 + 0.9$ to about $1.5 \times$ wt % $Al_2O_3 + 1.1$ percent by weight;
(4) the temperature of said product slurry is maintained in the range of between about 90° and about 100° C. for a period of from about 1 hour to about 3 hours;
(5) the adjustment of the soluble potassium concentration of the liquid fraction removed from first separating means is to the range between about 0.6 to about 2.0 weight percent $K_2O$; and
(6) the temperature of the slurry resulting from step (7) supra is maintained in the range from about 0° C. to about 40° C. for a period of time ranging from about 0.4 to about 2.0 hours;

said improved process characterized by the fact that the concentration of the wet-process phosphoric acid congeneric impurities comprising $Al_2O_3$ and MgO are reduced therein in the range from about 70 to about 90 percent.

21. The process of claim 19 wherein:
(1) the adjustment of the $Al_2O_3$:MgO weight ratio of said reaction slurry is to about 2.53;
(2) the adjustment of the $Fe_2O_3$ catalyst concentration of said reaction slurry is to about 3.0 percent by weight;
(3) the adjustment of the fluorine concentration of the resulting product slurry is to about $1.5 \times$ wt % $Al_2O_3 + 1.0$ percent by weight;
(4) the temperature of said product slurry is maintained at about 90° C. for a period of time of about 2 hours;
(5) the adjustment of the soluble potassium concentration of the liquid fraction removed from first separating means is to the range between about 0.6 to about 1 weight percent $K_2O$; and
(6) the temperature of the slurry resulting from step (7) supra is maintained at about 25° C. for a period of time of about 1 hour;

said improved process characterized by the fact that the concentration of the wet-process phosphoric acid congeneric impurities comprising $Al_2O_3$ and MgO are reduced therein by about 90 percent.

22. The process of claim 19 wherein the source of said fluorine amendment for said product slurry is the off-gas from said reaction slurry.

23. The process of claim 19 wherein a substantial amount of said source of said fluorine amendment for said product slurry is the off-gas from said reaction slurry.

24. A process for the purification of wet-process phosphoric acid containing from about 40 to about 55 weight percent $P_2O_5$ and containing the congeneric impurities normally present therein including $Al_2O_3$, $Fe_2O_3$, MgO, $K_2O$ and F, which process comprises the steps of:
(1) adjusting the $Al_2O_3$:MgO weight ratio of said wet-process phosphoric acid to the range of about 2 to about 10;
(2) adjusting the $Fe_2O_3$ concentration of said wet-process phosphoric acid to the range of about 2.5 to about 5 percent by weight to effect the precipitation therein of the two crystalline compounds $(Na,K)_2SiF_6$ and $(Ca,Mg)Al_2F_8.2H_2O$, said $Fe_2O_3$ functioning as a catalyst;
(3) adjusting the fluorine concentration of said wet-process phosphoric acid to the range of about $1.5 \times$ wt % $Al_2O_3 + 0.7$ to about $1.5 \times$ wt % $Al_2O_3 + 1.3$ percent by weight to subsequently prevent precipitation therein of $(Fe,Al)_3KH_{14}(PO_4)_8.4H_2O$ and to effect the precipitation therein of the crystalline compounds $(Ca,Mg)Al_2F_8.2H_2O$ and $(Na,K)_2SiF_6$;
(4) maintaining the temperature of said wet-process phosphoric acid in the range between about 80° C. and about 130° C. for a period of time in the range between about 1 hour and about 6 hours;
(5) subsequently introducing at least a portion of said wet-process phosphoric acid into separating means to produce therein a liquid fraction and a solid fraction and to effect removal in said solid fraction $CaSO_4.0.5H_2O$ and said precipitated compounds $(Na,K)_2SiF_6$ and $(Ca,Mg)Al_2F_8.2H_2O$, and said liquid fraction having a congeneric impurity $K_2O$ weight percent of about 0.1;
(6) adjusting the soluble potassium concentration of the liquid fraction removed from said first separating means in step (5) supra to a range between about 0.6 to about 4.0 weight percent $K_2O$ to effect precipitation therein of the crystalline compounds $(Na,K)_2SiF_6$ and $(Fe,Al)_3KH_{14}(PO_4)_8.4H_2O$;
(7) maintaining the temperature of said liquid fraction as amended in step (6) supra in a temperature range of about 0° C. to about 100° C. for a period of time ranging from about 0.2 to about 10 hours; and
(8) subsequently introducing at least a portion of the slurry resulting in step (7) supra into second separating means to remove therefrom said crystalline compounds $(Fe,Al)_3KH_{14}(PO_4)_8.4H_2O$ and $(Na,K)_2SiF_6$;

said improved process characterized by the fact that the concentration of the wet-process phosphoric acid congeneric impurities comprising $Al_2O_3$ and MgO are reduced therein in the range from about 30 to about 90 percent.

25. The process of claim 24 wherein:
(1) the adjustment of the $Al_2O_3$:MgO weight ratio of said wet-process phosphoric acid is to the range of about 2.53 to about 4;
(2) the adjustment of the $Fe_2O_3$ catalyst concentration of said wet-process phosphoric acid is to the range of about 2.5 to about 3.5 percent by weight;
(3) the adjustment of the fluorine concentration of said wet-process phosphoric acid is to the range of between about $1.5 \times$ wt % $Al_2O_3 + -0.9$ to about $1.5 \times$ wt % $Al_2O_3 + 1.1$ percent by weight;
(4) the temperature of said wet-process phosphoric acid is maintained in the range of between about 90° C. and about 100° C. for a period of from about 1 hour to about 3 hours;
(5) the adjustment of the soluble potassium concentration of the liquid fraction removed from said first separating means is to the range between about 0.6 and about 2.0 weight percent $K_2O$; and
(6) the temperature of the slurry resulting from step (7) therein is maintained at about 0° C. to about 40° C. for a period of time ranging from about 0.4 to about 2.0 hours;

said improved process characterized by the fact that the concentration of the wet-process phosphoric acid congeneric impurities comprising $Al_2O_3$ and MgO are reduced therein in the range from about 70 to about 90 percent.

26. The process of claim 24 wherein:
(1) the adjustment of the $Al_2O_3$:MgO weight ratio of said wet-process phosphoric acid is about 2.53;
(2) the adjustment of the $Fe_2O_3$ catalyst concentration of said wet-process phosphoric acid is to about 3.0 percent by weight;
(3) the adjustment of the fluorine concentration of said wet-process phosphoric acid is to about $1.5 \times$ wt % $Al_2O_3 + 1.0$ percent by weight;
(4) the temperature of said wet-process phosphoric acid is maintained at about 90° C. for about 2 hours;
(5) the adjustment of the soluble potassium concentration of the liquid fraction removed from said first separating means is to the range between about 0.6 and about 1 weight percent $K_2O$; and
(6) the temperature of the slurry resulting from step (7) therein is maintained at about 25° C. for a period of about 1 hour;

said improved process characterized by the fact that the concentration of the wet-process phosphoric acid congeneric impurities comprising $Al_2O_3$ and MgO are reduced therein by about 90 percent.

* * * * *